United States Patent
Cheung (10) Patent No.: US 10,911,514 B2
(45) Date of Patent: Feb. 2, 2021

(54) SYNCHRONIZED WIRELESS AND VIDEO OPERATIONS

(71) Applicant: Apple Inc., Cupertino, CA (US)

(72) Inventor: David B. Cheung, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 16/111,184

(22) Filed: Aug. 23, 2018

(65) Prior Publication Data

US 2020/0068002 A1    Feb. 27, 2020

(51) Int. Cl.
*H04L 29/06* (2006.01)
*H04N 19/164* (2014.01)

(52) U.S. Cl.
CPC .......... *H04L 65/80* (2013.01); *H04N 19/164* (2014.11); *H04L 67/38* (2013.01)

(58) Field of Classification Search
USPC ......................................................... 709/219
See application file for complete search history.

(56) References Cited

U.S. PATENT DOCUMENTS

| | | | |
|---|---|---|---|
| 2008/0101466 A1* | 5/2008 | Swenson ............ | H04N 21/2402 375/240.07 |
| 2010/0164802 A1* | 7/2010 | Li ........................ | H04B 7/0695 342/372 |
| 2014/0096165 A1* | 4/2014 | Bei ................... | H04N 21/44209 725/81 |

* cited by examiner

*Primary Examiner* — Hermon Asres (74) *Attorney, Agent, or Firm* — Kilpatrick Townsend & Stockton LLP (57) ABSTRACT

Methods and systems are disclosed for joint scheduling of wireless and video activities. Video data may be accessed to estimate an encoding time interval for the video data, identify a per-frame display duration for the video data, and to define a non-encoding time interval. A schedule may be generated for a set of network-calibration events that indicates, for each network-calibration event of the set of network-calibration events. Streaming of the video data to a display device may be initiated such that for each frame of a set of frames represented in the video data: the frame is encoded, transmitted, and the set of network-calibration events is initiated according to the schedule. Each of the network-calibration event being configured to be initiated during a non-encoding time interval during which none of the set of frames are being encoded.

18 Claims, 7 Drawing Sheets

SYNCHRONIZED WIRELESS AND VIDEO OPERATIONS

FIELD

The present disclosure relates generally to wireless communications in accordance with synchronization of wireless and video operations, including performing network-calibration events at times locked to frame-encoding time periods.

BACKGROUND

Wireless communications use data packets to transmit data between connected devices. Wireless communications protocols may handle dropped packets (e.g., due to network congestion, communication errors, etc.) differently. For example, some wireless communication protocols may rely on the receiving device to identify packet loss and generate a request for the missing packets. Upon receiving the request, a transmitting device may re-send the missing packets. While re-sending dropped packets may be a suitable error correction strategy in some applications, in others, such as time sensitive (or low-latency) communications, the receiving device may not have sufficient time to wait for a retransmission. For example, for media streaming, the receiving device typically receives data at the same rate at which the data is presented to the user. If packets are lost in transmission, the receiving device cannot wait for the packets to be re-sent, as such a delay may disrupt the presentation. Instead, the receiving device may adjust performance characteristics (e.g., to maintain a previous frame across one or more subsequent "lost" frames causing visual artifacts, loss of resolution, or pausing the presentation) until the receiving device receives the next set of packets.

BRIEF SUMMARY

A method is disclosed for synchronized wireless and video operations, the method comprising: accessing, by a computing device, video data; estimating an encoding time interval for the video data that indicates a duration of encoding a single frame from the video data; identifying a per-frame display duration for the video data that indicates a period of time during which a single frame from the video data is to be displayed; defining a non-encoding time interval as being a difference between the per-frame display duration and the encoding time interval; generating a schedule for a set of network-calibration events that indicates, for each network-calibration event of the set of network-calibration events, a time at which the network-calibration event is to be initiated, the time being relative to a frame-processing event corresponding to a frame represented in the video data; streaming the video data to a display device, wherein the streaming includes, for each frame of a set of frames represented in the video data: encoding the frame; and transmitting the encoded frame, wherein the transmission is timed such that a time period between transmissions of sequential encoded frames is equal to the per-frame display duration; and initiating the set of network-calibration events in accordance with the schedule, wherein each network-calibration event of the set of network-calibration events is initiated during a non-encoding time interval during which none of the set of frames are being encoded.

Other methods may be disclosed herein, for example, the methods comprising: generating a video-data schedule that includes: a non-overlapping set of encoding time intervals, wherein, for each encoding time interval of the non-overlapping set of encoding time intervals, the schedule indicates that a particular video frame of a set of video frames is scheduled to be encoded; and one or more network-calibration times, wherein, for each network-calibration time of the one or more network-calibration times, the schedule indicates that a network-calibration event is to be initiated within a non-encoding time interval that extends between sequential encoding time intervals of the non-overlapping set of encoding time intervals; encoding the set of particular video frames in accordance with the video-data schedule such that relative timings of encoding the set of particular video frames corresponds to relative timings of the non-overlapping set of encoding time intervals in the schedule; and performing the network-calibration event in accordance with the video-data schedule such that, with respect to the network-calibration event, a time difference between initiating the network-calibration event and an initial time of encoding a next video frame accords with the video-data schedule.

A system is disclosed for synchronized wireless and video operations, the system comprising: one or more processors; and a non-transitory computer-readable medium including instructions which, when executed by one or more processors, cause the one or more processors to perform operations including: defining a non-encoding time interval, the non-encoding time interval occurring between encoding a first video frame and a second video frame; generating a schedule for executing one or more network-calibration events during the non-encoding time interval; initiating encoding of the first video frame; executing, in response to completing the encoding of the first video frame, the one or more network calibration events according to the schedule, wherein the one or more network-calibration events are executed during the non-encoding time interval; and initiating encoding of the second video frame after the non-encoding time interval, wherein initiating encoding of the second video frame occurs within a predetermined time period after encoding the first video frame.

Variations on these methods, systems, instructions, and devices also are described. Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Devices that communicate wirelessly may execute network-calibration events to modify, repair, improve, and/or establish wireless connections with one or more other devices. For example, beamforming can be used at a transmitting device by adjusting signal characteristics (e.g., phase and amplitude) to generate constructive and/or destructive interference across signals transmitted from an antenna array. The interference can result in spatially filtering portions of the output signal to direct the signal towards a receiving device, which can improve the signal-to-noise ratio of the signal received at the receiving device. One complication with network-calibration events is that changing a location of the transmitting device and/or receiving device typically changes an appropriate calibration. Issues are thus presented as to how frequently calibration events are to be performed when one (or both) of the transmitting device and receiving device is mobile.

On one hand, frequently performing network-calibration events (e.g., beam-tracking, beamforming refinement protocol, channel quality indicator, beam training, radio calibration, and/or the like) can improve communication quality. However, the events not only consume device resources—they also frequently interfere with communication capabilities. More specifically, various network-calibration events may prevent a transmitter or receiver (e.g., a radio) of the device from being operable to transmit or receive other communications. Thus, data packets may be dropped while network-calibration events are being performed. When the communications are configured to support (for example) real-time streaming, the dropped packets may noticeably negatively affect the presented stimuli (e.g., by resulting in paused media playback, visual artifacts on the screen, loss of resolution and/or the like).

In some instances, methods and systems disclosed herein relate to scheduling network-calibration events relative to transmission times of various content frames. This scheduling can facilitate repeated performance of calibration events while reducing the effect on content transmission relative to traditional techniques. Thus, wirelessly streaming media may be improved since calibration events can facilitate high signal-to-noise characteristics and scheduling the network-calibration events can facilitate high frame throughput.

In some instances, individual network-calibration events can be scheduled to occur relative to the times at which individual content data sets (e.g., individual frames of video data) are transmitted. Scheduling is performed while streaming video (or media) data. More specifically, a transmitting device typically encodes each individual content data set before transmitting it to a receiving device. When successive content data sets have similar attributes (e.g., data sizes), an encoding time is frequently consistent across the data sets. Techniques disclosed herein can bias network-calibration events to occur during non-encoding time intervals (e.g., a time period extending from a time at which encoding of a previous content data set completed and ending at a time at which encoding a next content data set is to begin). In some instances, each of one or more network-calibration events can be scheduled to be performed in its entirety during a non-encoding time interval. In some instances, a duration of a network-calibration event is longer than a duration of a non-encoding time interval. The network-calibration event may then be scheduled to be initiated before the encoding of the previous content data completes generating a partially encoded content data. The partially encoded data content may still include the frame of video data while omitting other data (e.g., error correction codes, etc.). In some instances, the network-calibration event may begin following a completed frame encoding. Since the encoding process executes in parallel to the computing device's radio events (e.g., transmissions, network-calibration events, etc.), the long network-calibration event will not affect the encoding interval. The encoded frame may be transmitted following the network-calibration event which, due to the duration of the network-calibration event being longer than the duration of a non-encoding time interval, may cause the encoded frame to arrive late (e.g., packet latency) or be dropped.

Figure 1:
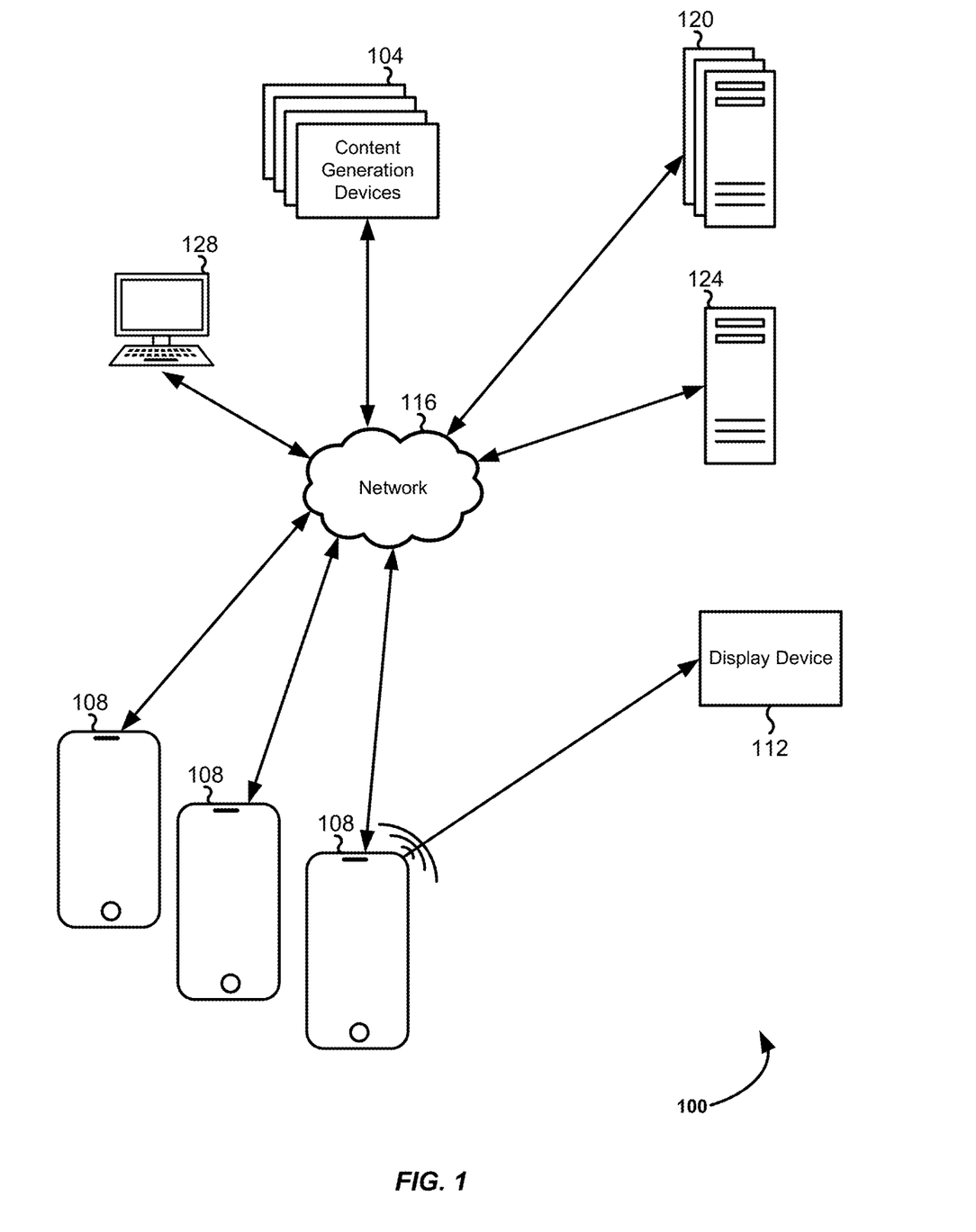
FIG. 1 is an exemplary block diagram of an environment supporting streaming communications.

FIG. 1 illustrates an exemplary block diagram of an environment 100 supporting streaming communications. Environment 100 can include one or more content generation devices 104, each of which can identify and/or generate content and stream the content to one or more mobile devices 108. For example, a computing device 104 can retrieve the content (e.g., from a remote source), which can include video data that includes a set of sequential frames (e.g., in which one or more intensity values are identified for each pixel in each frame). Streaming the content can include sequentially encoding and transmitting (e.g., wirelessly transmitting) the frames.

One or more content generation devices 104 may include any type of device that generates and/or accesses media data (e.g., audio, video, virtual reality applications, etc.). For example, content generation devices 104 can include one or more of smart phones, tablets, computers, or combinations thereof. A content generation device 104 can be, but need not be, a mobile device.

In some instances, content generation device(s) 104 can generate video data to be stored or streamed to one or more display devices. For example, the video data may be computer-generated imagery that is part of a virtual reality environment, an augmented reality environment, a video game, a simulation, a movie, a video clip, and/or the like. For example, one or more content generation device(s) may generate video data corresponding to a virtual reality video game configured to be streamed to a head-mounted display. A computing device (e.g., such content generation devices 104 or other devices associated with the virtual reality head-mounted display) may provide processing functions that control the functions of the video game and stream a set of video frames to the virtual reality head-mounted display to present the video data.

In some instances, content generation device(s) 104 can dynamically generate at least part of the video data that is encoded and transmitted. The dynamic generation can be based on (for example) one or more rules, one or more outcomes and/or one or more communications received from one or more display devices 112 (e.g., that identifies a characteristic of movement of the device, a characteristic of a position of the device, an eye movement or position tracked at the device, a voice input detected at the device, etc.). The dynamic generation can include (for example) identifying a portion of a 360-degree view to be displayed, identifying a feature (e.g., a character, a tool, a data object) to be superimposed on a background, identifying a physical movement (or characteristic thereof) to be represented in a series of frames, and so on. The dynamic generation can use one or more scenes or background images, one or more visualizations of one or more people or objects, one or more algorithms for positioning objects, one or more techniques for changing a portion of a scene to be viewed, and so on.

Content generation device(s) 104 store generated video data and/or retrieve some or all of the video data that is encoded and transmitted. For example, video data (e.g., or scenes or images that are to be used for dynamic generation of video data) generated by one or more content devices may be transmitted over network 116 and stored in data center 120 or server 124. Content generation devices 104 may request the video data from a data center 120 or server 124, which may be received over network 116.

Client devices 128 may generate requests for media data over network 116 to server 124 or data center 120 for display of the video data by client devices, mobile devices 108, and/or display devices 112. For example, client device 128 may generate a request to display a movie on display device 112 to server 124 or data center 120. In response to receive a request for particular video data, data center 120 may identify a storage location of the video data within data center 120 and transmit (or stream) the video data to the requested device (e.g., display device 112). In some instances, data center 120 and/or server 124 may determine how the request is to be satisfied (e.g., what device to send the video data and in what format: as one or more files, or as a stream). For example, if the requested display device lacks the capability to store the entire video data or render the video data from the one or more files, data center 120 and/or server 124 may determine that video data is to be streamed to the display device. Client devices 128 may provide input indicating a device that is to provide the video stream (e.g., data center 120, server 124, client devices 128, or mobile devices 108). In response to the input, data center 120 and/or server 124 may transmit the video data to the streaming devices (or initiate the stream to the display device if data center 120 and/or server 124 is selected).

Mobile devices 108 may include devices that communicate wirelessly with network 116, cellular networks, and/or other nearby devices such as display device 112. Devices 108 may include mobile devices, laptops, smartphones, and/or the like. An exemplary mobile device 108 is depicted and further described in connection to FIG. 7 below. Mobile devices may communicate with nearby devices that may lack communication capabilities with network 116 (e.g., lacking a compatible transceiver or lacking security permissions). For example, display device 112 may be a head mounted display with few processing resources available apart from rendering received video data. Mobile device 108 may provide processing for video data and/or associated data (e.g., video game operations, augmented reality, etc.) for the head mounted display. For example, in response to sensor data received from the head mounted display, the mobile device 108 may determine a portion of a 360-degree view to be displayed by the display device.

Data center 120 may receive and store data (e.g., including video data) from content generation devices 104, server 124, client devices 128, mobile devices 108, and/or any other device configured to transmit data over a network. For example, data center 120 may be a content host that receives requests for video data (e.g., generated by content generation devices 104) from device over network 116. In some instances data center 120 may be a data cloud that operates a set of decentralized server and storage devices. In some instances, data center may determine if the requesting device is authorized to access the requested video data before satisfying the request.

Server 124 may manage the operations and requests for video data that are received over network 116. For example, server 124 may receive (or intercept) requests for video data from requesting devices and determine how the requests are to be satisfied. For example, a server may determine whether to transmit the video data or stream the video based on, e.g., a type of the video data requested, a type of device that is to display the video data, and/or a type of device that generated the request. For example, for a request to display video data on a head mounted display device (e.g., 112) generated from mobile device 108, the server may determine that the mobile device is configured to stream the video data. The server may then transmit the whole video data (e.g., one or more files) to mobile device 108 such that mobile device 108 may stream the video data to the head mounted display device 112. The server's determination may be based on, e.g., a capability of the mobile device to provide streaming services to the display device 112 and/or a lack of processing/storage capability of the display device 112. Server 124 may also provide load balancing for requests for video data. For example, video data may be transmitted to a device configured to stream it to a display device to reduce network congestion that would be caused by the server streaming the video data.

Display device 112 may include any device (e.g., computing device, television, virtual reality head-mounted display, augmented reality display, wearable, and/or the like) configured to present video data to users. Display device 112 may receive requests to present media data over one or more wireless protocols (e.g., Bluetooth, Wi-Fi, 60 GHz, etc.) from mobile devices 108. Upon receiving the request, display device 112 may be configured to present the video data in a manner that is requested. For example, the request to display video data may include one or more display characteristics such as, but not limited to, an expected frame rate, a type of video data (e.g., two-dimensional video, three dimensional video, virtual reality, augmented reality, etc.), etc. The display device may present the video data using, or in accordance with, the display characteristics.

Figure 2:
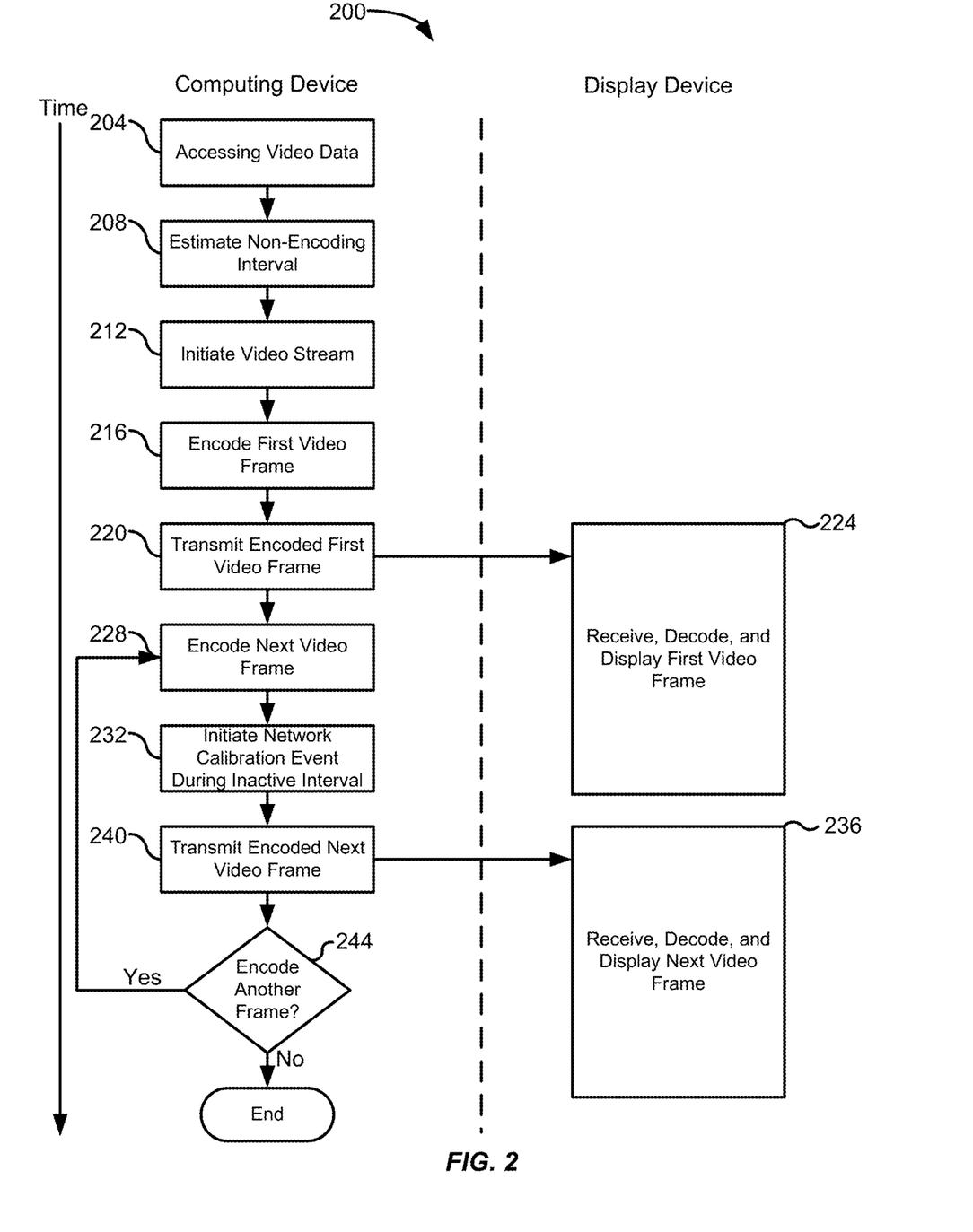
FIG. 2 is an exemplary block diagram depicting streaming video frames to a display device.

FIG. 2 illustrates an exemplary flow 200 depicting operations that may be executed to stream video data to a display device. At block 204, a computing device accesses video data. Accessing video data can include requesting and receiving video data from a remote computing device (e.g., a cloud server), remote storage device, local storage device, cache memory, and/or the like. Video data may be received over one or more wired and/or wireless connections, e.g., over a network. In some instances, video data is at least partly generated at the computing device.

Video data may include one or more video frames (e.g., images) that are configured to be displayed for a predetermined amount of time and in a predetermined order. For example, a video frame may be configured to be displayed for a duration of 41.7 milliseconds (e.g., 24 frames displayed per second) to 4.17 milliseconds (e.g. 240 frames per second).

Video frames may be composed of set of pixels, each corresponding to a particular intensity, set of intensities (e.g., RGB intensities), and/or color. The particular color displayed by a pixel may be defined by color values indicating an amount of red, green, and blue that together appear as the particular color. The number of pixels in the set of pixels of a frame can (in some instances) indicate a resolution of the frame, which may indicate an amount of time needed to encode the frame. Higher resolution frames include a greater number of pixels and, in at least some instances, may take longer to encode than lower resolution frames.

In some instances, the video data may specify the resolution of the frames to be displayed (e.g., a minimum resolution, a maximum resolution, a default resolution, and/or the like). The resolution may be modified upon detection of one or more network-related events. For example, when one or more properties of a connection (e.g., signal-to-noise ratio, bandwidth, etc.) are below a threshold, the resolution of one or more frames (or the set of frames) may be reduced from a default or maximum resolution to a lower resolution. Conversely, when the one or more properties exceeds the threshold, the resolution may be increased, such as returning to a default or maximum resolution. In some instances, the frame may include a mixed resolution (e.g., foveated) based on a pixel density of portions of the frame. For example, a particular portion of the frame may have a higher pixel density (e.g., a higher resolution) than other portions of the frame. In those instances, input received from the display device may indicate a focal point of a displayed frame that has a user's attention (e.g., using eye tracking, etc.), causing the focal point of subsequently encoded frames to have a higher resolution than non-focal areas of the frames. Mixed-resolution frames may maintain a consistent average resolution across frames, which may improve the quality of the portion of the frame that has the user's attention without increasing the encoding time.

In some instances, the video data may include live images, such as video received using a camera of the computing device or display device. For example, video data may be captured by a camera of the display device, transmitted to the computing device for processing, and retransmitted to the display device in real-time for an augmented reality application. In some instances, the video data may include pre-recorded video (e.g., movies, etc.), computer-generated imagery (e.g., animations, video games, augmented reality, etc.), and/or the like. For example, the video data may be computer-generated imagery generated for a display by a virtual reality head-mounted display. Each frame of the video data may represent a 360 degree image with corresponding metadata. The metadata may indicate how the display of the frame may be modified based on a location and/or orientation of the display device. For example, the head mounted display may display only a portion of the 360 degree image. Upon detecting movement, for example, of the mobile device orienting to a new direction, the portion of the 360 degree image corresponding to the new direction (or new field of view) may be displayed.

In some implementations, the computing device and display device can be components of a virtual reality or augmented reality system. Virtual reality and/or augmented reality display devices may dynamically generate the presentation of the video data of based on a location and/or orientation of the display device. One or more sensors of the display device (e.g., GPS, gyroscopes, accelerometers, etc.) may be used to determine a location and/or orientation. In some examples, the display device may transmit the location/orientation information to the computing device continuously (regularly, or upon detecting a change in a location/orientation) and the computing device may modify one or more subsequent frames based on the location/orientation information. In other examples, the computing device may transmit metadata with the frames that may enable the display device to modify frames using the location/orientation information. Alternatively, a network-calibration event may be used to determine the location. For example, beam-forming may be used to determine an angle and distance of the display device relative to the computing device. The computing device may synchronize subsequent video frames with the movement and/or orientation of the display device. For example, if a user takes a step or turns the head-mounted display, the next few frames of the video data may be modified to appear consistent with the step and/or head turn.

In some instances, such as virtual reality and/or augmented reality applications, multiple views or images may be generated for a frame of video data. For example, virtual-reality and augmented-reality display devices may include multiple displays that can present a different image, e.g., to each eye of a user to cause the user to view two images together as a single three-dimensional image. The two images may appear as the same image, though the two images may have a slightly different perspective angle. The two frames may be generated and encoded for transmission together (e.g., the same data packet) or separately. In some instances, the metadata transmitted with a frame may enable the display device to generate the corresponding one of the two frames based on a transmitted other of the two frames.

At block 208, a non-encoding time interval may be estimated. The non-encoding time interval may be estimated based, in part, on the duration of time used to encode an individual video frame in the video data. The non-encoding time interval can further be estimated with respect to a time period during which an individual video frame is to be presented at the display device (e.g., a per-frame display duration). For example, the display device may be configured to render a video frame for a particular interval (e.g., a per-frame display duration). A video frame may be encoded in less time than the per-frame display duration. Thus, the difference between the per-frame display duration and a per-frame encoding duration can be identified as a non-encoding time interval. While a display device is displaying a first frame, a transmitting device may encode a second video frame, but the transmitting device may then wait until the second frame is being displayed before encoding a third frame. Thus, a per-frame display duration can correspond to a combination of an encoding time interval and a non-encoding time interval. The non-encoding time interval may or may not be of a fixed length (e.g., across video data, display devices, portions of a video data set, etc.). For example, display devices that use a higher refresh rate may have a shorter non-encoding time interval. In addition, any/all of resolution, frame rate, codec, content, and/or error correction protocols, may influence the length of the non-encoding time interval. Other factors also may influence the length of time required for encoding and thus also influence the non-encoding time interval.

At block 212, the computing device initiates streaming the video data. In some instances, initiating the streaming can include establishing one or more communication parameters for a communication channel with a display device and/or performing one or more network-calibration events. For example, the computing device can perform a beam-forming process to determine how to configure transmission signals across an antenna array to effectively communicate with a display device.

At block 216, the computing device encodes a first video frame. Frames may be encoded by compressing the frame into a particular compression format such as, but not limited to, MEPG-2, MPEG-4, H.261, H.264, H.265, or the like. Encoding frames may reduce the size of data that is transmitted to the display device. For example, a frame may be encoded by removing portions of the frame (e.g., removing values corresponding to the pixels or the pixels themselves) that are similar to portions of a preceding frame such that the frame may be defined in terms of only the differences between the frame and the preceding frame. The size of the encoded frame may be much smaller than the size of the un-encoded frame, which in turn reduces the amount of data require to transmit the frame to the display device.

In some instances, frames may be encoded using the differences between the frame and a subsequent frame. In still yet other instances, frames may be encoded using the differences between the frame and both the subsequent frame and the preceding frame. Encoding may use a video codec (e.g., software instructions or a circuit) that is configured to encode and decode frames using a particular compression format. For example, the computing device and display device may each have a video codec to enable encoding by the computing device and decoding by the display device. Encoded frames may be transmitted via data packets to the display device. Each frame may be transmitted to the display device using one or more data packets (e.g., the encoded frame may be broken up and transmitted in pieces and reassembled at the display device).

At block 220, the computing device transmits the encoded first video frame (e.g., to a display device). The transmission can include a wireless transmission performed using a wireless protocol. In some instances, the transmission includes broadcasting the encoded first video frame. In some instances, the transmission is performed in accordance with parameters identified during a previously performed network-calibration event.

At block 224, a display device receives, decodes and displays the first video frame. The display device may decode the received encoded first video frame using a video codec that is the same or compatible with the video codec used by the computing device to encode the video frame. Decoding a video frame decompresses the video frame, e.g., using the preceding frame and the differences between the frame and the preceding frame to regenerate the similar portions of the frame that were removed.

While the first video frame is being displayed (e.g., frame n), at block 228, the computing device encodes a next video frame (e.g., frame n+1). The encoding can occur over an encoding time interval. It will be appreciated that the encoding time interval need not serve as a constraint on how long the encoding can take. Rather it can retrospectively identify a time that encoding a frame took.

At block 232, the computing device performs one or more network-calibration events. Network-calibration events may include one or more of a beamforming refinement protocol, beam-tracking, channel quality indicator, radio calibration, or the like. In some instances, a network-calibration event is initiated after the next video frame has been encoded. For example, the network-calibration event may be initiated as soon as the encoding at block 224 has completed. As another example, a duration for performance of the network-calibration event can be estimated, and the network-calibration event can be initiated at a time corresponding to a time at which encoding of a subsequent frame is predicted to occur (e.g., based on a schedule or consistent inter-encoding durations) minus the estimated duration of the network-calibration event. In some instances, a buffer can further be introduced, such that a start time for an event is defined to be a predicted time of starting encoding of a subsequent frame minus the estimated duration of the network-calibration event minus the buffer. In some instances, the network-calibration event can be initiated while encoding from block 224 is still being performed and/or prior to full encoding of the frame at block 224.

At block 232, the computing device transmits the encoded next video frame (e.g., to the display device). At block 236, the display device receives, decodes and displays next video frame.

While the next video frame is being displayed at the display device, the computing device can determine whether to encode another frame at block 240. For example, the determination can include determining whether each frame within a video file has been encoded and transmitted, whether a predefined time period has elapsed since initiating streaming or transmitting a first encoded frame, and/or whether a local input or communication (e.g., from the display device) has been detected that corresponds to an instruction to cease video display.

When it is determined that another frame is to be encoded, process 200 can return to block 224 such that another video frame can be encoded (while the next video frame continues to be displayed at block 236). Another network-calibration event can be performed at block 228, and the encoded other frame can be transmitted at block 232 (which can then again be received, decoded and displayed at the display device at block 236). Iterations of blocks 224-240 can continue until it is determined not to encode another frame at block 240.

It will be appreciated that the type of network-calibration event and/or the number of network-calibration events performed at block 228 may vary across iterations. For example, a beam-tracking event may be performed during a non-encoding time interval following each encoding event, but additionally a beamforming refinement protocol event may also be periodically performed (e.g., every 12 frames and/or approximately every 100 milliseconds) in addition to or in-place of the beam-tracking event.

Figure 3:
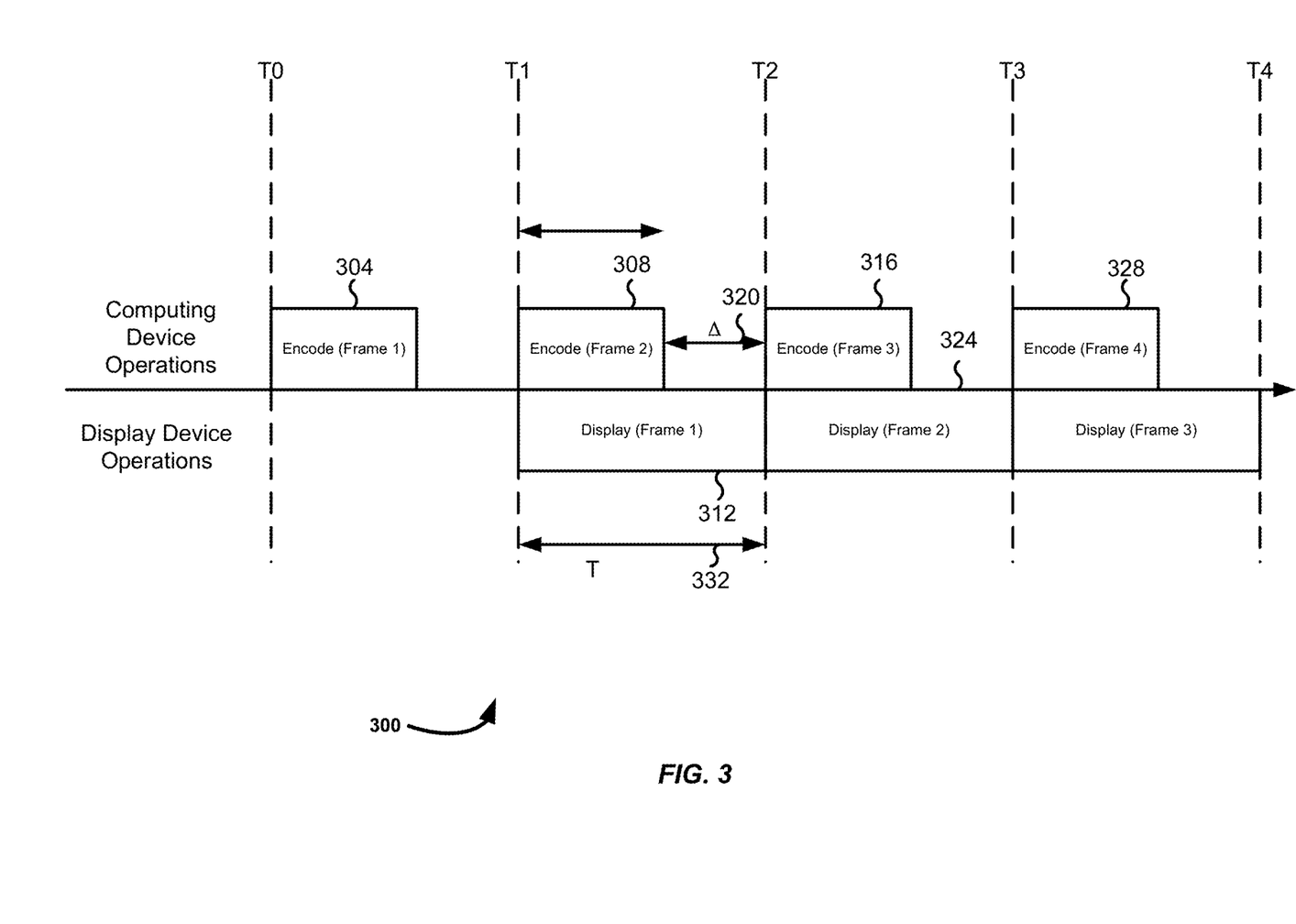
FIG. 3 is an illustration representing example operations performed by a computing device and a display device during video streaming.

FIG. 3 shows an illustration representing operations 300 performed by a computing (e.g. transmitting) device and a display device during video streaming. Upon initiating a video stream (e.g., T0), a first video frame may be encoded by the computing device over a first encoding time interval 304. In some instances, operations performed during an encoding interval may include transmitting the encoded frame to the receiving device. In other instances, the encoded video frame may be transmitted to the display device once the encoding is complete and after the encoding time interval 304.

At T1, the computing device may begin encoding a second frame over a second encoding time period 308, which may be of a similar duration, approximately the same duration, or exactly the same duration as first encoding time period 304. The second frame can be a next frame to be presented after the first frame at the display device (e.g., in a static video or dynamically generated image sequence).

Each encoded frame may be decoded by the display device prior to being displayed. In some examples, the display device may decode the frame as soon as it is received and display the decoded frame upon a fixed schedule (e.g., T1, T2, etc.). In other examples, the display device decodes the frame at T1 and displays the frame immediately thereafter. At T1, the display device may begin displaying the first frame during display interval 312. The display device may display each individual frame for a fixed duration of time, referred to herein as a display duration 332 T. Display duration 332 can be longer than an average, median, mode or maximum encoding time period across a streaming task. Display duration 332 may be predefined. In some instances, a display device identifies a display duration through a local or remote look-up. In some instances, display duration 332 determines a time at which to change a display of a frame based on a time at which one or more encoded frames are received. In the depicted instance, the time interval extending between successive encoding time periods (e.g., between the end of second encoding time period 308 and a beginning of a third encoding time period 316) is referred to as a non-encoding time interval 320 Δ.

At T2, the computing may begin encoding a third frame over a third encoding time period 316. At T2, the display device may display the second frame over a second display interval 324. Another non-encoding time interval (e.g., which may be of a same or similar duration as non-encoding time interval 320) may correspond to the time between completion of encoding the third frame and beginning of encoding a fourth frame (e.g., during a fourth encoding time period 328).

During wireless streaming, it may be desirable to perform one or more network-calibration events. In some instances, performing network-calibration events periodically (e.g., frequently) during a streaming transmission can facilitate maintaining a high-quality connection between the two devices. For example, the computing device may be a smartphone transmitting video for display by a television. The user of the computing device may be moving in a room relative to the television and the movement may interfere (at least at some points) with a direct wireless connection. The transmitting device can include an array of antennas. Performing a beamforming operation can include modulating the phase and/or magnitude of one or more individual antennas within the array. This modulation can create constructive and/or destructive interference between signals associated with the array and may thereby direct the transmission to a particular spatial location (e.g., the television) relative to the transmitting device.

Executing radio-calibration tasks may prevent a device from transmitting or receiving video data. For example, if the computing device executes a beam-tracking operation (e.g., tracking changes to a connection and updating the beamforming), the computing device can drop one or more packets transmitted to the computing device while the beam-tracking operation is executing. Similarly, in some instances, the beam-tracking event may impede or prevent the computing device from transmitting packets (e.g., portions of one or more encoded frames) during the beam-tracking (e.g., network-calibration) event. The computing device may then delay transmitting the packets or skip the packets in favor of transmitting the next frame on time.

In some instances, network-calibration events are performed (for example) at pseudo-random or regularly spaced times in a manner such that each of one or more types of network-calibration events are performed at a particular frequency or a particular number of times (e.g., corresponding to a predefined frequency or number, a frequency or number determined based on evaluation of a rule, a frequency or number determined based on feedback received from the display device that is indicative of one or more quality metrics, and so on). In some instances, timing of network-calibration events relative to frame-encoding times may be variable and/or coincidental. As noted above, performing network-calibration events during times at which frames are to be encoded can result in packet dropping, which may cause visual artifacts (e.g., glitches), temporary reduced resolution, paused playback, and/or the like in the video displayed by the display device.

Figure 4:
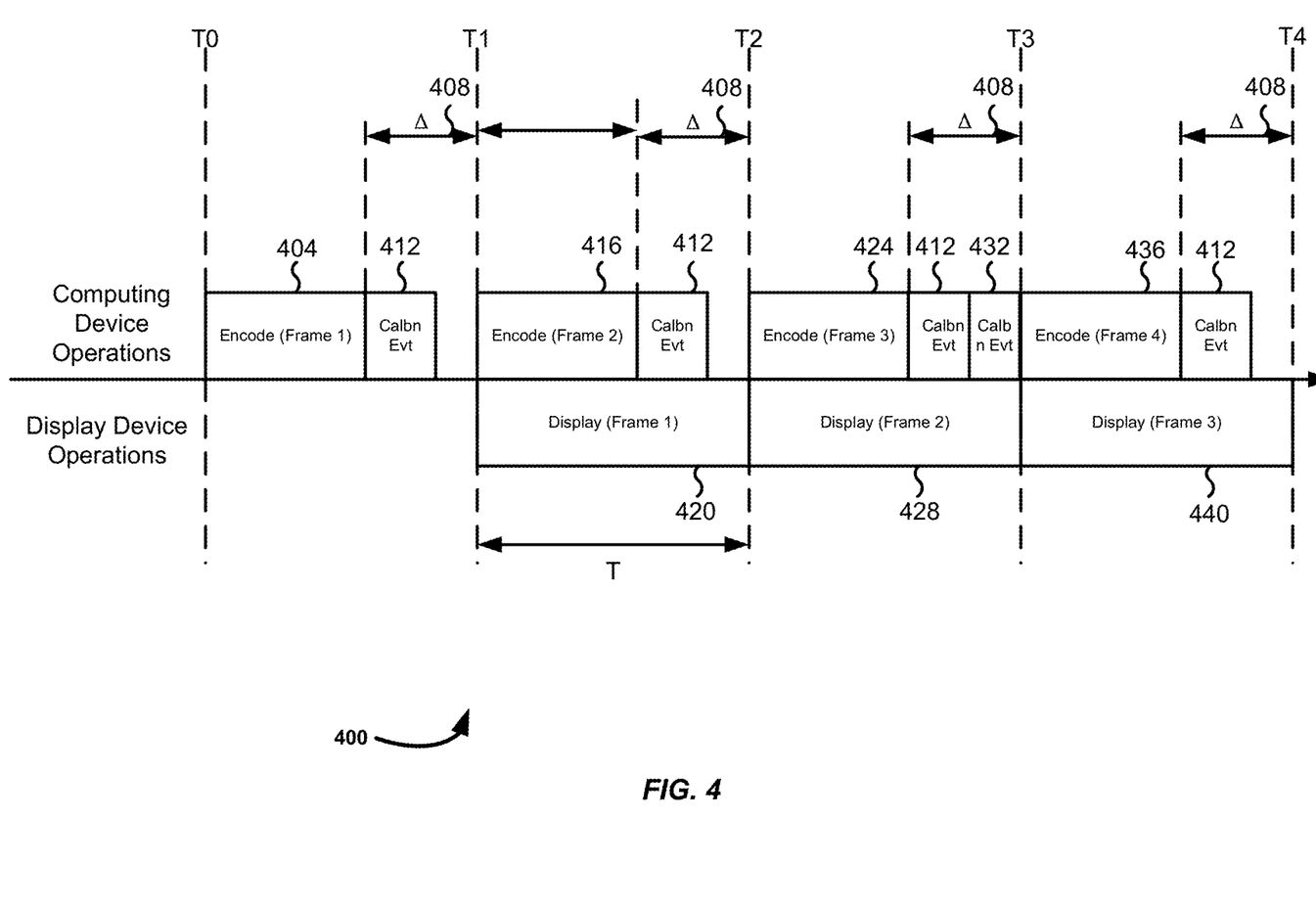
FIG. 4 is an illustration representing example operations performed by a computing device and a display device scheduling network-calibration events.

FIG. 4 shows an illustration representing operations 400 performed by a computing (e.g. transmitting) device and a display device. In the depicted instance, in addition to encoding individual frames, the computing device further performs network-calibration events. Notably, the network-calibration events are scheduled to occur during non-encoding time intervals.

At T0, the computing device initiates encoding of a first frame. Encoding of the first frame can occur over a first encoding time interval 404 of a first frame. In some instances, operations performed during an encoding interval may include transmitting the encoded frame to the receiving device. First encoding time interval 404 is followed by a non-encoding time interval 408 that extends until T1, at which the computing device initiates encoding of a second frame. In this instance, the computing device performs a first type of network-calibration event during non-encoding time interval 408. The first type of network-calibration event is performed within a first calibration-event time interval 412 that is fully within non-encoding time interval 408.

Another instance of the first type of network-calibration event can be performed after a second encoding time period 416. The display device can be displaying the first frame during a first frame display interval 420, which can coincide with the computing device's encoding and network-calibration actions.

In the depicted instance, following a third encoding time interval 424, two network-calibration events are performed during non-encoding time interval 408. Specifically, the first type of network-calibration event is again performed during first calibration-event time interval 412. Further, a second type of network-calibration event is performed during a second calibration-event time interval 432. Each of first calibration-event time interval 412 and second calibration-event time interval 432 are performed within non-encoding time interval 408. In the depicted instance, the first type of network-calibration event and the second type of network-calibration event are performed sequentially. In some instances, network-calibration events may be performed concurrently or at least partially overlapping in time.

Figure 5:
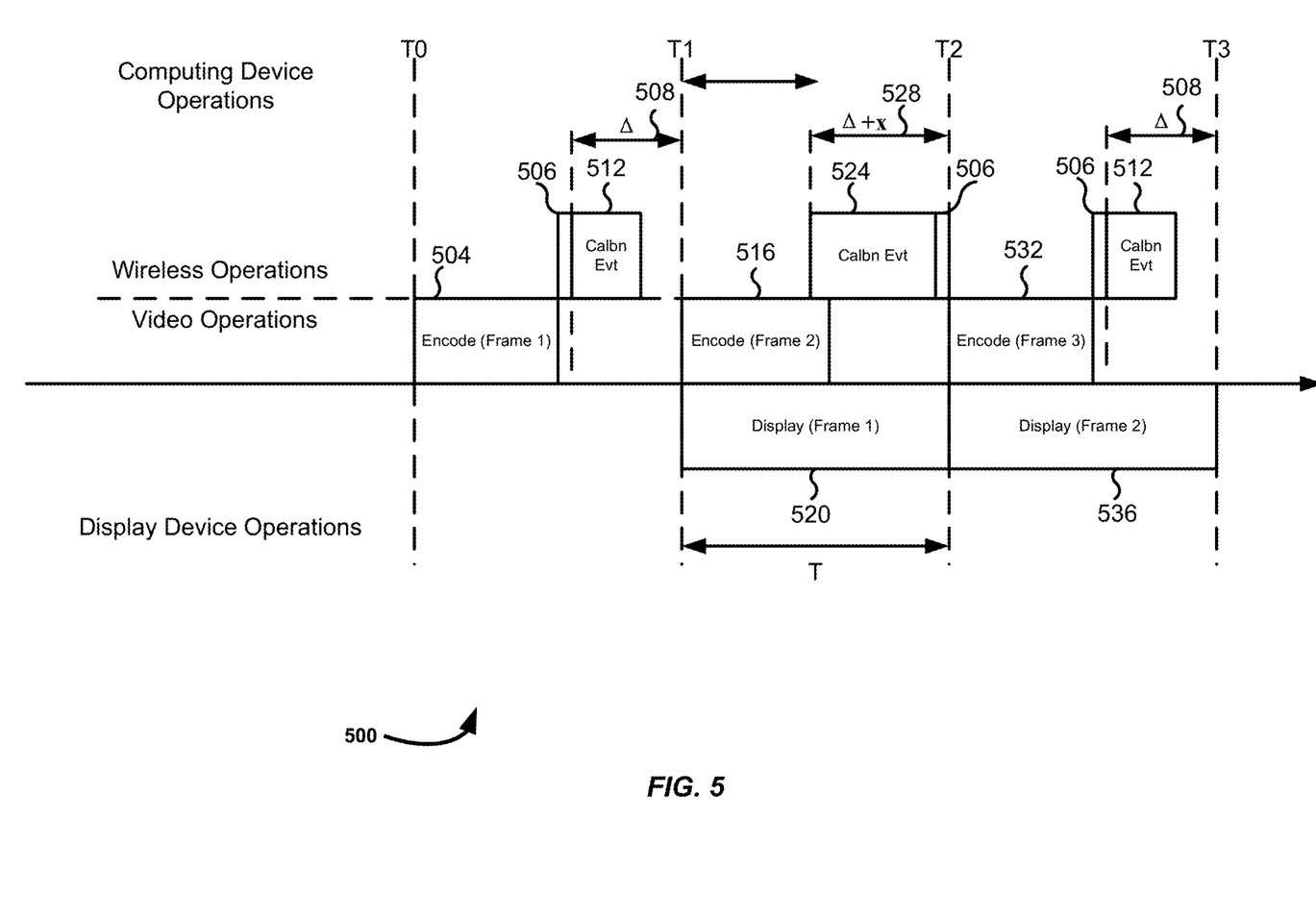
FIG. 5 is an illustration representing example operations performed by a computing device and a display device that reduce the impact of network-calibration events.

FIG. 5 is an illustration representing operations performed by a computing device and a display device that reduce negative video-display impact of network-calibration events. The computing device performs at least two types of operations: wireless operations (e.g., transmissions, network-calibration events, etc.) and video operations (e.g., encoding frames for transmission, etc.). At T0, the computing device initiates encoding of a first frame, which is then performed across a first encoding interval 504. When the first frame has completed encoding (e.g., at the end of the first encoding interval 504), the first frame may be transmitted during a transmission interval 506 to the display device. As noted above in connection to FIG. 3 and FIG. 4, operations performed during an encoding interval may include transmitting the encoded frame to the receiving device. Whereas FIG. 3 and FIG. 4, illustrated these operations in a single encoding block (e.g., 304 or 404), FIG. 5 illustrates the operations of frame encoding during encoding intervals e.g., 504, and transmitting the encoded frames during transmission interval a 506. The combined encoding and transmission interval may be used to define a non-encoding interval e.g., 508 Δ. During the non-encoding interval 508, a network-calibration event can be performed over a calibration-event time interval 512.

At T1, the computing device initiates encoding of a second frame, which is then performed over a second encoding time interval 516. Second encoding time interval 516 coincides with a first display interval 520, during which the first frame is displayed at the display device. It may be estimated that a duration for performing a second type of network-calibration event, that is to be performed during first display interval 520, exceeds non-encoding time interval 508 Δ by an exceeding duration of x. Thus, the second type of network-calibration event may be scheduled to be performed during event interval 524, which begins during (and in parallel to) a normal encoding time interval 516.

Since the network-calibration event may prevent wireless transmission from being sent or received, the transmission interval 506 in which the encoded second frame is to be transmitted may be delayed until after the event interval 524 completes. In some instances, event interval 524 and transmission interval 506 may be scheduled such that the second encoded frame may be received by the display device in time to decode and display the second frame (e.g. at T2). In some instances, such as when the transmission interval terminates after the frame is scheduled for display, the computing device and/or the display device may execute corrective operations such as, but not limited to, displaying the previous frame until the late frame is received, dropping the frame (e.g., doubling the display interval for the previous frame), displaying a portion of the frame (e.g., some layers of the frame), In some examples, the second type of network-calibration event may be a beamforming-refinement protocol that may use data from a previous event to refine and/or update a direction in which subsequent transmissions are to be sent. Beamforming-refinement protocols may use beam-tracking events (e.g., that indicate variations in signal transmission and reception) and/or sensors (e.g., accelerometer, gyroscopes, GPS, and/or the like) to update the beamforming. For example, mobile devices may move and/or rotate causing a directional-based connection to deteriorate. A beamforming-refinement protocol may be initiated to improve, refine, and/or reestablish a connection that has deteriorated due to movement, rotation, and/or any other environmental factors. A beamforming-refinement protocol may be initiated every n frames (where n is greater than 1) or to occur after an elapse of a predefined period since a previous occurrence (where the predefined period is greater than a per-frame display duration) to reduce an impact on encoding processes. By scheduling the event to end at or shortly before a next encoding performance, at least an initial part of the encoding can be uninterrupted and an overall interruption of encoding performances can be reduced or minimized (e.g., by increasing or maximizing use of non-encoding time intervals). A beamforming-refinement protocol may also be initiated upon detecting sensor data (e.g., representing a movement or rotation) that exceeds a threshold. The detection may trigger scheduling the beamforming-refinement protocol to be performed within a next frame at a time that encompasses non-encoding time interval 508 (e.g., and that ends at or prior to a subsequent encoding time interval).

Thus, network-calibration events that have a duration that exceeds the non-encoding interval can be scheduled to begin prior to full encoding of a frame being encoded and to terminate at the beginning of a next encoding process or shortly before a next encoding process begins. This can reduce or minimize impact that the network-calibration event has on transmitting encoded frames. For example, frames may be defined in layers with general color and background being represented in one or more base layers and each successive layer (e.g., enhancement layers) adding additional detail (e.g., resolution). In some instances, the encoding interval may be truncated by eliminating one or more of the layers. In other instances, such as when the encoded frame is transmitted late, either the computing device will transmit only a portion of the encoded frame (e.g. less one or more layers) or the display device may not render a portion of the encoded frame (e.g., the last enhancement layer(s) in the frame). Since the frame is displayed for a short period, e.g., 4.3 milliseconds (or shorter if the encoded frame was late), the effect of one reduced resolution frame every n frames will likely be unnoticeable. In some instances, the portion of the frame that may be omitted may correspond with non-video data. For example, the computing device may append encoded frames with error correction data (e.g., cyclic redundancy check, Reed-Solomon codes, and/or the like) that can be used by the display device to ensure the received data is not corrupted. In some instances, error correction data may be omitted to reduce encoding time interval, transmission duration, and/or the like which may not impact visualization of the frame.

Figure 6:
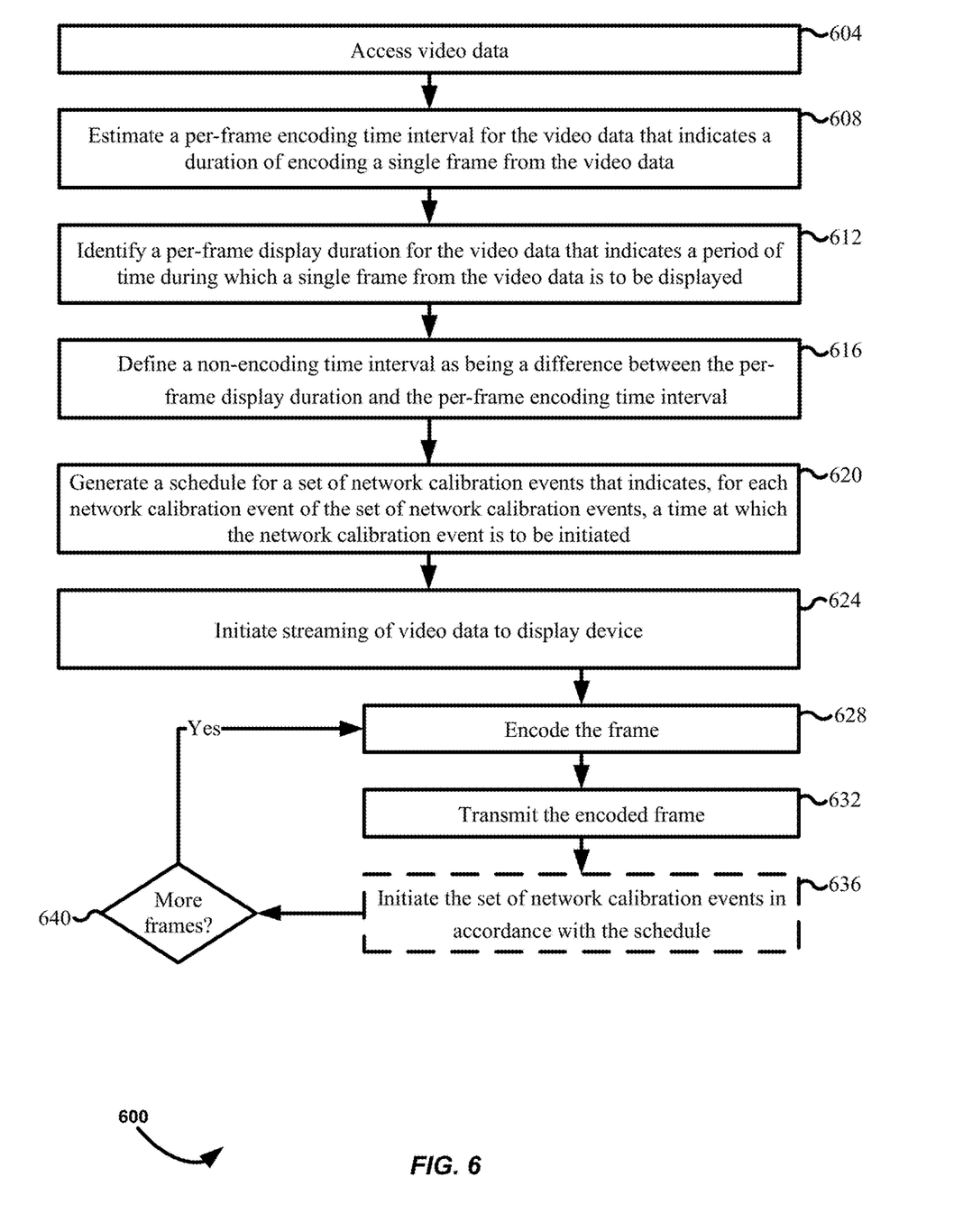
FIG. 6 is an exemplary flowchart depicting a process for wireless media streaming with scheduled network-calibration events.

FIG. 6 shows an exemplary flowchart describing a process 600 of wirelessly streaming media from a computing device to a display device. Process 600 begins at block 604, at which video data may be accessed. In some examples, the video data may be accessed locally (e.g., from one or more memories within the computing device) or externally (e.g., from a content host, server, other remote computing device, etc.). For example, block 604 can include transmitting a request from a user for video data to a remote device (e.g., cloud server) and receiving a response that includes the video data. In some instances, the request may identify a particular video, movie, video file or movie file. In some instances, the request may include one or more attributes. The remote device can use the attributes to query a data store to identify a particular video, movie, video file or movie file that is returned responsive to the request.

At block 608, a per-frame encoding time interval for the video data may be estimated. In some examples, the per-frame encoding time interval may include a duration of time used by a computing device to encode the video frame for transmission to a display device. It may be assumed that a duration of encoding each frame within the video data will be approximately the same in view of consistency of size across the frames. Thus, a single per-frame encoding time interval may apply to each of some or all frames in the video data.

The encoding duration can be estimated based on (for example) a size of individual frames within the accessed video data. For example, the encoding duration can be estimated based on the number of pixels included in each frame. The encoding duration can be estimated based on the types of value(s) identified for each pixel in a frame (e.g., a single grayscale value versus three RGB values). In some instances, the encoding duration is estimated to be a product of a per-pixel encoding duration and a number of pixels within a frame (e.g., potentially added to a addend). In some instances, an encoding duration is estimated based on monitored encoding times tracked for other frames that were previously encoded. Weights of a function may then be derived or categories may be established (e.g., such that frames having a pixel count that is between n1 and n2 are estimated to have an encoding time of x).

At block 612, a per-frame display duration may be identified. The per-frame display duration may be a duration of time in which the display device displays a frame of the video data. In some examples, the per-frame display duration may be fixed by a display device. In other examples, the per-frame display duration may be predetermined by client input, an instruction transmitted to the display device, the video data, and/or the like. In some examples, the per-frame display duration may be based on a frame rate (e.g., frames displayed per second) selected by the display device and/or a frame rate parameter of the rate video data that is transmitted to the display device. For example, the per-frame display duration may be 41.7 ms to achieve 24 per second. The frame rate of the display device may be in a range from 24 frames per second to 240 frames per second (e.g., where the per-frame display duration is 4.1 ms). In some examples, the frame rate can be estimated to be 120 frames per second, such that the per-frame display duration is 8.3 ms.

At block 616, a non-encoding time interval may be estimated for the video data. The non-encoding time interval may be estimated to be a duration of time equal to the difference between per-frame display duration and the per-frame encoding time interval. For example, a frame may be encoded and transmitted to a display device for display. While the display device is displaying the frame, a new frame may be encoded by the computing device. Since the frame encoding time is frequently less than the per-frame display duration, the computing device will complete encoding of the new frame before the display device is available to display the new frame. The duration of time between encoding of the new frame and the display device displaying the new frame may be designated the non-encoding time interval, during which the computing device is not encoding frames.

At block 620, a schedule may be generated for a set of network-calibration events. The schedule may indicate for each network-calibration event of the set of network-calibration events a time at which the network-calibration event is to be initiated. Network-calibration events may include, e.g., operations that determine the status of a radio or a connection with the display device. Network-calibration events may include, e.g., operations that repair, improve, modify, and/or establish a wireless connection with the display device. For example, network-calibration events may include any/all of beam-tracking, beamforming refinement protocol, channel quality indicator, radio calibration, and/or the like.

Both beam-tracking events and beamforming refinement protocol events may improve connection quality with the display device by using constructive and destructive interference to form a beam (e.g., a transmission) in a particular direction (e.g., towards the display device). A beam-tracking event tracks small variations in a connection to provide small corrections in the beam (e.g., small refinement in the direction of the transmissions). Beamforming refinement protocol can identify a different path between the computing device and the display device and form a beam (e.g., transmission) in the direction of the different path. For example, if the computing device moves relative to the display device the beamforming refinement protocol event enables the subsequent signal to be transmitted in the correct direction. Beam-tracking events are shorter in duration than beamforming refinement protocol events. Channel quality indicator events measure the signal-to-noise ratio as well as other signal quality metrics to determine a connection quality.

Network-calibration events may be scheduled to initiate and terminate within the non-encoding time interval between encoding frames. In some instances, two or more network-calibration events may be scheduled, provided there is sufficient time within the non-encoding time interval. For example, assuming the non-encoding time interval is 3.3 milliseconds, a beam-tracking event that uses 2 milliseconds may be initiated in the same non-encoding interval as a radio calibration event that uses 1 millisecond. In some examples, a long network-calibration event may use more time than is available during the non-encoding time interval. A long network-calibration event may be initiated during the per-frame encoding interval time (and stopping the encoding of that frame) such that the network-calibration event terminates when the next per-frame encoding time interval begins.

In some instances, the per-frame encoding time interval may be terminated prematurely with reduced or minimal to no impact on the partially encoded frame. For example, during the final portions of the per-frame encoding time interval the encoding may include non-frame (or non-image) data (e.g., error correction codes, etc.). Terminating the per-frame encoding time interval early may eliminate some or all of the non-frame data. In some examples, frames may be defined in layers with one or more base layers providing coarse image data and each successive (e.g., enhancement) layer providing more detail (e.g., resolution). In this example, terminating the per-frame encoding time interval may eliminate one or more of the layers of the frame. The frame may appear recognizable, but lack some minor details that may be unnoticeable given the short duration in which the frame may be displayed. A long network-calibration event may be scheduled to terminate when the subsequent per-frame encoding time interval initiates. While long network-calibration events may affect the encoding operation that preceded the non-encoding interval, the subsequent encoding and displaying operations are unaffected.

In other instances, the network-calibration event may be executed in parallel to the per-frame encoding time interval. For example, a network-calibration event that may exceed the non-encoding interval may be scheduled to begin before the encoding interval terminates without affecting the encoding interval. At the termination of the encoding interval, the encoded frame may be prevented from being transmitting until the network-calibration event terminates. The encoded frame may be transmitted (although delayed) to the display device. The network-calibration event may be scheduled to initiate such that the encoded frame may be transmitted to the display device before the end of the non-encoding time interval.

At block 624, the video data may be streamed to a display device where, for each frame of a set of frames:

At block 628, a frame is encoded.

At block 632, the frame is transmitted to the display device.

At block 636, the set of network-calibration events may be initiated in accordance with the schedule. For example, network-calibration events of the set of network-calibration events may be initiated during the non-encoding time interval between encoding successive frames. In some non-encoding time intervals, one or more network-calibration events of the set of network calibrations events may be scheduled to initiate. In other non-encoding time intervals, no network-calibration events may be scheduled to initiate during those non-encoding time interval.

At block 640, it may be determined if there are more frames to encode. If there are one or more frames to encode, process 600 may return to step 628 where a next frame of the video data may be encoded. If it is determined that there are no more frames to encode, then process 600 terminates.

Figure 7:
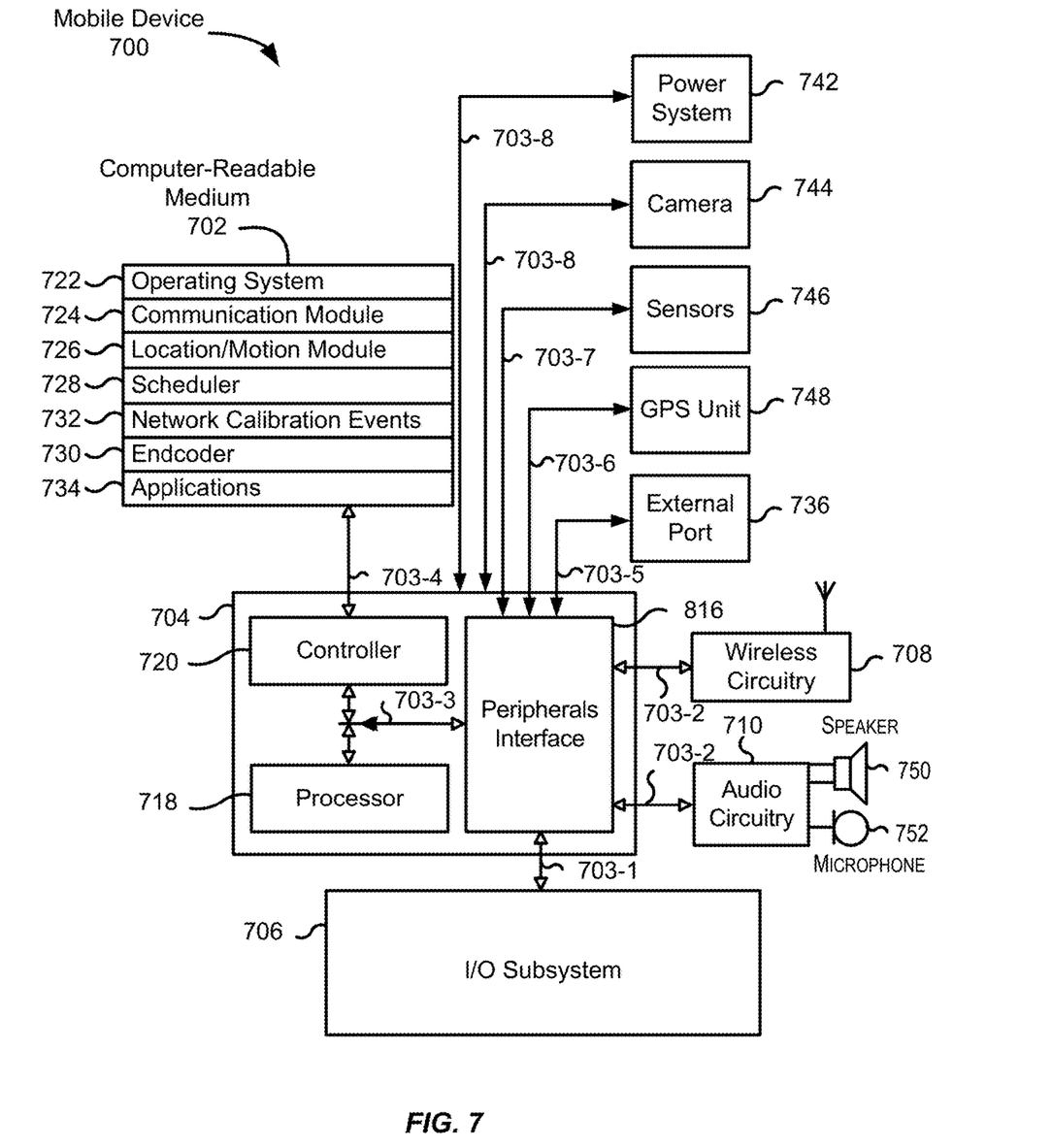
FIG. 7 is a block diagram of an example device according to embodiments of the present invention.

FIG. 7 is a block diagram of an example device 700, which may be a computing device that streams video data to a display device. Device 1200 generally includes computer-readable medium 702, a processing system 704, an Input/Output (I/O) subsystem 706, wireless circuitry 708, and audio circuitry 710 including speaker 750 and microphone 752. These components may be coupled by one or more communication buses or signal lines 703. Device 700 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 708 can use various protocols, e.g., as described herein. Wireless circuitry 708 can include a single antenna or an array of antennas.

Wireless circuitry 708 is coupled to processing system 704 via peripherals interface 716. Peripherals interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats for one or more application programs 734 stored on medium 702.

Peripherals interface 716 couple the input and output peripherals of the device to processor 718 and computer-readable medium 702. One or more processors 718 communicate with computer-readable medium 702 via a controller 720. Computer-readable medium 702 can be any device or medium that can store code and/or data for use by one or more processors 718. Medium 702 can include a memory hierarchy, including cache, main memory and secondary memory.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes a camera 744. In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some embodiments, device 700 can include a GPS receiver, sometimes referred to as a GPS unit 748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for device 700. In some embodiments, the software components include an operating system 722, a communication module (or set of instructions) 724, a location module (or set of instructions) 726, calibration-event code 728, a scheduler 730, an encoder 732, and other applications (or set of instructions) 734, such as a car locator app and a navigation app. Calibration—event code 728 may include instructions that operate wireless circuitry 708 to execute individual network-calibration events (e.g., beamforming, beam-tracking, etc.). For example, calibration-event code 728 may be configured to generate and provide instructions to selectively control the phase and/or magnitude of signals transmitted by each transmitter of wireless circuitry 708. By controlling the phase and magnitude of signals, interference across signals emitted from different transmitters can be controlled, which can control a direction of overall transmission (e.g., corresponding to constructively interfered signals).

Scheduler 728 may include instructions for scheduling network-calibration events. For example, scheduler 728 may identify encoding and display durations that correspond to individual frames to be streamed for a given streaming occurrence and to a particular display device. Scheduler 728 can also identify network-calibration targets that can indicate (for example) indications as to how frequently one or more types of network-calibration events are to be performed, what types of occurrences are to trigger performance of a given type of network-calibration event, a typical duration of a given network-calibration event, and so on. It will be appreciated that one or more durations (e.g., an encoding duration, display duration and/or network-calibration-event duration) may be learned by scheduler 728. Scheduler 728 can then identify a schedule that indicates when one or more types of network-calibration events are to be performed (and/or initiated) relative to a video-related timing (e.g., initiation of an encoding of a frame, transmission of an encoded frame, completion of fully encoding a frame, and so on).

Encoder 732 can be configured to encode individual video frames to be formatted for digital transmission. Frames may be encoded using a video compression protocol that reduces the data (e.g., pixel values and/or pixels themselves) that is transmitted to a receiving device. Aa frame may be compared to a previous frame identifying the similarities between the frame and the previous frame. The similarities may be removed (e.g., pixel values and/or pixels themselves) leaving only the differences between the frames. For example, a video of a car driving may have a first frame and a second frame that include the car (e.g., similarities), even though the background may change slightly between frames (e.g., differences). The similarities do not need to be transmitted as the receiving device may decode the frame using the previous frame to add the similarities back into the frame. The encoded frame may include significantly less data which may reduce the amount of data that is transmitted. In some instances encoder 732 may compare a frame to a subsequent frame in addition to, or in place of, the comparison to the previous frame.

Operating system 722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., USB, FireWire, Lightning connector, 60-pin connector, etc.) is adapted for coupling directly to other devices or indirectly over a network (e.g., the Internet, wireless LAN, etc.).

Location/motion module 726 can assist in determining the current position (e.g., coordinates or other geographic location identifier) and motion of device 700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 726 receives data from GPS unit 748 and analyzes the signals to determine the current position of the mobile device. In some embodiments, location/motion module 726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 708 and is passed to location/motion module 726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 700 based on the position coordinates of the corresponding transmitters. Regardless of the specific location technology used, location/motion module 726 receives information from which a location fix can be derived, interprets that information, and returns location information, such as geographic coordinates, latitude/longitude, or other location fix data.

The one or more applications 734 on the mobile device can include any applications installed on the device 700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or track pad. In some embodiments, I/O subsystem 706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A method comprising:
accessing, by a computing device, video data;
estimating an encoding time interval for the video data that indicates a duration of encoding a single frame from the video data;
identifying a per-frame display duration for the video data that indicates a period of time during which a single frame from the video data is to be displayed;
defining a non-encoding time interval as being a difference between the per-frame display duration and the encoding time interval;
generating a schedule for a set of network-calibration events that indicates, for each network-calibration event of the set of network-calibration events, a time at which the network-calibration event is to be initiated, the time being relative to a frame-processing event corresponding to a frame represented in the video data;
streaming the video data to a display device, wherein the streaming includes, for each frame of a set of frames represented in the video data:
encoding the frame; and
transmitting the encoded frame, wherein the transmission is timed such that a time period between a beginning of a transmission of the encoded frame and a beginning of transmission of a next encoded frame is equal to the per-frame display duration; and
initiating the set of network-calibration events in accordance with the schedule, wherein each network-calibration event of the set of network-calibration events is initiated during a non-encoding time interval during which none of the set of frames are being encoded.

2. The method of claim 1, further comprising:
determining that a duration of a subsequent network calibration event not included in the set of network-calibration events exceeds the non-encoding time interval following a particular frame of the set of frames; and
initiating, responsive to determining the subsequent network calibration event exceeds the non-encoding time interval, the subsequent network calibration event before the particular frame finishes encoding.

3. The method of claim 1, wherein the frame-processing event includes initiation of or completion of: encoding the frame or transmitting an encoded version of the frame.

4. The method of claim 1, wherein a non-encoding time interval begins after a frame is encoded and ends when encoding of a next frame begins.

5. The method of claim 1, wherein the network-calibration event includes one or more of a beam-tracking operation or a beamforming refinement protocol operation.

6. The method of claim 1, wherein a network-calibration event of the set of network-calibration events is initiated during a non-encoding time interval that occurs after a plurality of frames are encoded.

7. A method comprising:
generating a video-data schedule that includes:
a non-overlapping set of encoding time intervals, wherein, for each encoding time interval of the non-overlapping set of encoding time intervals, the video-data schedule indicates that a particular video frame of a set of video frames that is scheduled to be encoded; and
one or more network-calibration times, wherein for each network-calibration time of the one or more network-calibration times, the video-data schedule indicates that a network-calibration event is to be initiated within a non-encoding time interval that extends between a beginning of an encoding time interval and a beginning of a subsequent encoding time interval of the non-overlapping set of encoding time intervals;
encoding the set of video frames in accordance with the video-data schedule such that relative timings of encoding the set of video frames corresponds to relative timings of the non-overlapping set of encoding time intervals in the video-data schedule; and
performing the network-calibration event in accordance with the video-data schedule such that, with respect to the network-calibration event, a time difference between initiating the network-calibration event and an initial time of encoding a next video frame accords with the video-data schedule.

8. The method of claim 7, further comprising:
determining that a duration of a second network-calibration event exceeds the non-encoding time interval; and
initiating, responsive to the duration of the second network-calibration event exceeding the non-encoding time interval, the second network-calibration event before encoding of a corresponding video frame is completed.

9. The method of claim 7, wherein a particular network calibration event delays a first video frame from being transmitted, and wherein scheduling the particular network-calibration event causes the first video frame to be transmitted before initiating encoding of a second video frame.

10. The method of claim 7, wherein the network-calibration event includes one or more of a beam-tracking operation or a beamforming refinement protocol operation.

11. The method of claim 7, further comprising:
transmitting a first video frame, wherein the first video frame is transmitted after encoding the first video frame and before initiating encoding of a second video frame.

12. The method of claim 7, wherein a first video frame is configured to be displayed during encoding of a second a subsequent video frame.

13. A system comprising:
one or more processors; and
a non-transitory computer-readable medium including instructions which, when executed by one or more processors, cause the one or more processors to perform operations including:
defining a non-encoding time interval, the non-encoding time interval occurring between encoding a first video frame and a second video frame;
generating a schedule for executing one or more network-calibration events during the non-encoding time interval;
initiating encoding of the first video frame;
executing, in response to completing the encoding of the first video frame, one or more network-calibration events according to the schedule, wherein the one or more network-calibration events are executed during the non-encoding time interval; and
initiating encoding of the second video frame after the non-encoding time interval, wherein initiating encoding of the second video frame occurs within a predetermined time period after encoding the first video frame.

14. The system of claim 13, wherein the operations further include:
determining that a duration of a second network-calibration event scheduled to be executed following encoding of the second video frame exceeds the non-encoding time interval; and
initiating, responsive to determining that the second network-calibration events exceeds the non-encoding time interval, execution of the second network-calibration event before encoding of the second video frame is completed.

15. The system of claim 13, wherein a particular network calibration event of the one or more network-calibration events delays the first video frame from being transmitted, and wherein scheduling the particular network-calibration event causes the first video frame to be transmitted before initiating encoding of the second video frame.

16. The system of claim 13, wherein the one or more network-calibration events includes one or more of a beam-tracking operation or a beamforming refinement protocol operation.

17. The system of claim 13, wherein the operations further include:
transmitting the first video frame after encoding the first video frame and before initiating encoding of the second video frame.

18. The system of claim 13, wherein the first video frame is configured to be displayed during encoding of the second video frame.

* * * * *

UNITED STATES PATENT AND TRADEMARK OFFICE
CERTIFICATE OF CORRECTION

Page 1 of 1

PATENT NO.       : 10,911,514 B2
APPLICATION NO.  : 16/111184
DATED            : February 2, 2021
INVENTOR(S)      : David B. Cheung It is certified that error appears in the above-identified patent and that said Letters Patent is hereby corrected as shown below:

In the Drawings
Sheet 2, Fig. 2, delete "network calibration" and insert --network-calibration--
Sheet 6, Fig. 6, delete "network calbration" and insert --network-calibration-- (there are 4 separate instances)
Sheet 7, Fig. 7, delete "Network Calibration" and insert --Network-Calibration--

In the Specification
Column 2, Line 34 and Column 16, Line 57, delete "network calibration" and insert --network-calibration--

In the Claims
Column 22, Claim 2:
Lines 9-10, delete "subsequent network calibration event" and insert --subsequent network-calibration event--
Lines 14-15, delete "subsequent net-work calibration event" and insert --subsequent network-calibration event--
Line 16, "subsequent network calibration event" and insert --subsequent network-calibration event--
Column 22, Claim 9:
Lines 65-66, delete "particular network calibration event" and insert --particular network-calibration event--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*